June 22, 1937.  C. P. ZUMWALT  2,084,370

THERMOMETER GUARD

Filed Sept. 13, 1935

Charles P. Zumwalt
INVENTOR

BY
ATTORNEY

WITNESS-

Patented June 22, 1937

2,084,370

UNITED STATES PATENT OFFICE 2,084,370

THERMOMETER GUARD

Charles P. Zumwalt, Coquille, Oreg., assignor to Industrial Patents Corporation, Chicago, Ill., a corporation of Delaware Application September 13, 1935, Serial No. 40,451

14 Claims. (Cl. 73—52)

This invention relates to an improved thermometer guard and support.

One of the objects of this invention is to provide novel supporting means for maintaining the bulb portion of a thermometer sufficiently submerged within a liquid body to assure an accurate reading of the temperature at all times during the processing of the liquid.

Another object of this invention is to provide a thermometer guard means in combination with a supporting means to prevent breakage of the thermometer while submerged within a liquid body.

Another object of this invention is to provide a novel thermometer guard and support for safely and movably maintaining a thermometer within a liquid body whereby a prompt and accurate reading of the temperature of the liquid may be taken at any surface point during the processing of the liquid.

Other objects of the invention will be apparent from the description and claims which follow.

In the processing of liquids, such as milk and cream, it is often necessary that the temperature be constantly and accurately maintained. In practice, it is customary to stir a thermometer within the liquid from time to time to secure periodic temperature readings during the processing thereof. By such a method, it is necessary that the unheated thermometer be held within the liquid a few moments to completely react to the temperature of the liquid body. This requires the time of an operator from other duties.

Floating thermometers of various types have been proposed from time to time but thermometers of this kind heretofore used are not completely submerged and fail to give a reading of the temperature a substantial distance below the surface. Furthermore, such thermometers are not completely guarded from accidental breakage. The guard of the present invention affords complete protection without insulating the bulb or obscuring the stem when the thermometer is lifted for a reading.

A preferred embodiment of the present invention is disclosed in the accompanying drawing in which similar reference characters in the several figures designate similar parts.

Figure 2:
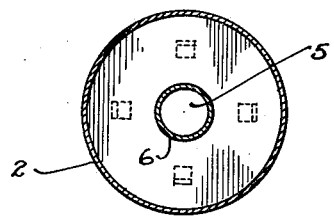
Figure 2 is a sectional view taken on line 2—2 of Figure 1.
Figure 1:
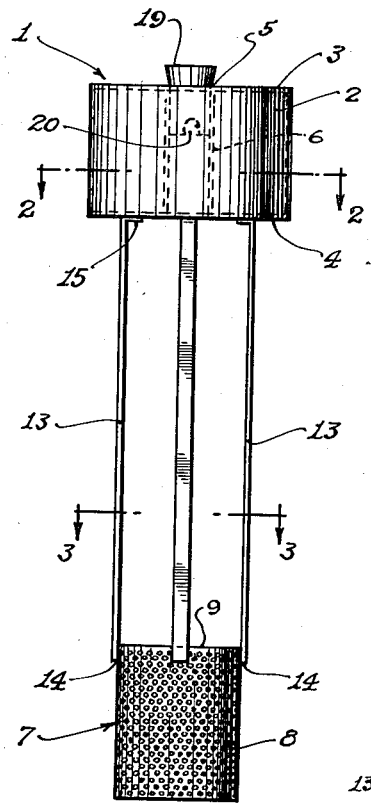
Figure 1 is a side elevation of the device forming the present invention.
Figure 3:
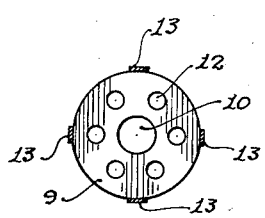
Figure 3 is a sectional view taken on line 3—3 of Figure 1.

Referring now to the drawing: 1 represents a buoyant float having a cylindrical body 2 and end walls 3 and 4. End walls 3 and 4 are centrally bored to provide opening 5. Float 1 is sealed at opening 5 by sleeve 6, secured between end walls 3 and 4 by soldering or in any other suitable manner.

The numeral 7 represents a guard member consisting of a perforated cylindrical shell 8 having an open bottom and a top 9. The top 9 is provided with a central opening 10 and a plurality of radially disposed openings 12. Guard member 7 is concentrically secured below float 1 by a plurality of metal strips 13. Metal strips 13 are secured by soldering or in any other suitable manner to guard member 7 at 14 and to float 1 at flanged ends 15.

The thermometer employed in the present invention is of the usual straight stemmed type having a bulb portion 16 and a stem portion 17. The thermometer is provided intermediate its ends, preferably between the bulb portion 16 and stem portion 17, with a radial boss 18.

Figure 4:
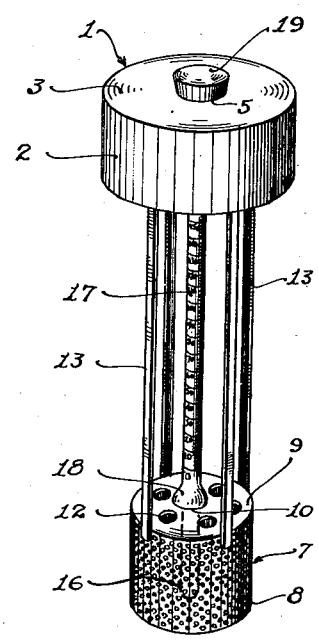
Figure 4 is a perspective view of the device shown in Figure 1, illustrating the manner in which the thermometer is carried therein.

As shown in Figure 4, the thermometer is mounted in openings 5 and 10 with the bulb portion 16 housed within guard member 7. Boss 18 engages top 9 at opening 10 by which the thermometer is maintained at its desired position between float 1 and guard 7. The open bottom in guard member 7, the perforations in shell 8 and openings 12 in top 9 provide free circulation of the liquid around bulb portion 16 such that the true temperature of the liquid body will at all times during the processing of the liquid be accurately indicated on stem portion 17.

Guard member 7 is supported below the surface of the liquid body by float 1 and provides a center of gravity to float 1, by which the thermometer is vertically maintained within the liquid body.

Stem portion 17 terminates within sleeve 6 and abuts stopper or cork 19 which may be provided with a recess 20 to assure a fixed position of the stem relative to the guard.

The present invention is also adapted for use in the processing or cooking of solids in a liquid bath, such as vegetables and the like. In processing or cooking solids, the metal strips 13 and guard member 7 will serve to protect the thermometer against breakage by articles floating near the surface. It is apparent, of course, that additional strips 13 may be secured between float 1 and guard member 7 to prevent contact of the small articles with stem portion 17. Furthermore, the device may be permitted to float freely in a cream vat without danger of damage to the thermometer by accidental contact with stirring implements.

I claim:

1. In combination with a thermometer, a float, a guard member spaced from and below the float, and means connecting the guard member with the float, the float and guard member having means for holding the thermometer therebetween.

2. In combination with a thermometer having a straight stem portion and a bulb portion, a float having means for supporting said stem portion and a dependent guard member spaced from and below said float for supporting said bulb portion, said guard member having openings for permitting free circulation of a liquid about said bulb portion.

3. In combination with a thermometer having a straight stem portion and a bulb portion, a float having means for supporting said stem portion, a dependent guard member consisting of a cylindrical shell spaced from and below said float for supporting said bulb portion and guard rods connecting said guard member with said float.

4. In a device of the class described the combination of a thermometer having a stem portion and a bulb portion, a float having means for supporting said stem portion, a guard member for supporting said bulb portion and a plurality of metal strips for holding said guard member in operative relation with said float, said guard member providing a center of gravity to said float by which the thermometer will be maintained in a vertical position in a liquid body.

5. In combination with a straight-stemmed thermometer, a float, a dependent guard member in operative relation with said float and spaced guard rods connecting said guard member with said float, said float and guard member having means for supporting the thermometer therebetween and said guard member providing a center of gravity to said float by which the thermometer will be maintained in a vertical position.

6. In a device of the class described the combination of a thermometer having a stem portion and a bulb portion, and a guard member engageable with said thermometer about said bulb portion, said guard member consisting of a cylindrical shell having a perforated top and side wall to provide free circulation of a liquid about said bulb portion.

7. In a device of the class described the combination of a thermometer having a stem portion and a bulb portion, and a guard member engageable with said thermometer about said bulb portion, said guard member consisting of a cylindrical shell having a perforated top and side wall and an open bottom to provide free circulation of a liquid about said bulb portion.

8. In combination with a thermometer having a stem portion and a bulb portion, a cylindrical float having a central opening for supporting said stem portion and a guard member concentrically secured below said float for the reception of said bulb portion, said guard member consisting of a cylindrical shell having a perforated top and side wall and an open bottom to provide free circulation of a liquid about said bulb portion.

9. A thermometer guard comprising a buoyant support, a cylinder having an open bottom and a perforated top and side wall below said support, and guard rods rigidly connecting said support and said cylinder, said support and said cylinder being provided with openings for maintaining a thermometer between said rods.

10. A thermometer guard consisting of a buoyant support, a cylinder having an open bottom and a perforated top and side walls concentrically secured below said support, and guard rods rigidly connecting said support and said cylinder, said support and said cylinder having centrally disposed openings for maintaining a thermometer between said guard rods.

11. A thermometer guard comprising a float, a guard member spaced from and below the float and means connecting the guard member with the float, the float and guard member having means for supporting a thermometer therebetween.

12. A thermometer guard comprising a float, a guard member spaced from and below the float and spaced guard rods connecting the guard member with the float, the float and guard member having means for supporting a thermometer therebetween.

13. A thermometer guard comprising a float, a guard member comprising a perforated cylinder spaced from and below the float, and means connecting the guard member with the float, the float and guard member having means for supporting a thermometer therebetween.

14. A thermometer guard comprising a float, a guard member comprising a cylindrical shell having a perforated top and side wall spaced from and below the float, and spaced guard rods connecting the guard member with the float, the float and guard member having means for supporting a thermometer therebetween.

CHAS. P. ZUMWALT.